Oct. 10, 1939.  E. J. HULL  2,175,398

HYDRAULICALLY OPERATED FLOW REVERSING VALVE

Filed Jan. 18, 1937  2 Sheets-Sheet 1

INVENTOR
Edwin J. Hull
BY
ATTORNEY

Oct. 10, 1939.　　　　　　E. J. HULL　　　　　2,175,398
HYDRAULICALLY OPERATED FLOW REVERSING VALVE
Filed Jan. 18, 1937　　　2 Sheets-Sheet 2

INVENTOR
Edwin J. Hull
BY
ATTORNEY

Patented Oct. 10, 1939

2,175,398

UNITED STATES PATENT OFFICE 2,175,398

HYDRAULICALLY OPERATED FLOW REVERSING VALVE

Edwin J. Hull, Cleveland, Ohio, assignor to Traben Engineering Corporation, Cleveland, Ohio, a corporation of Ohio Application January 18, 1937, Serial No. 121,068

12 Claims. (Cl. 184—7)

My invention pertains to a flow reversing device for automatically reversing the direction of fluid flow applied to a distributing line, comprising series feeders, in response to the pressure of the applied fluid, and the proper functioning of the distributing system.

It is an object of my invention to provide a fluid flow reversing device comprising fluid dispensing valve means movably disposed in a casing for selectively dispensing injected fluid received through an inlet port out of either one of two line ports alternatively into the end of an associated distributing line, and having means responsive to the return of dispensed fluid from the other end of the line for shifting the fluid dispensing valve means to dispense the fluid out of the alternate one of the line ports into the other end of the distributing line, whereby a reversible flow of fluid is automatically supplied to the distributing line.

It is also an object of my invention to provide such a fluid flow reversing device comprising an actuating piston connected with the dispensing valve for alternatively moving it from either one of its operative positions, a control valve for applying fluid pressure to reversibly operate the actuating piston, a control valve actuating piston for actuating said control valve, and means controlled by said fluid dispensing valve for applying the dispensed fluid returning from the associated line for reversely actuating the control valve actuating piston whereby the actuating piston is automatically moved in either direction to control the dispensing valve in accordance with the condition of the circulated fluid dispensed from either outlet port.

It is a further object of my invention to provide such a fluid flow reversing device comprising the combination of a slack motion connection between the control valve and the control valve actuating piston whereby a predetermined movement of the latter is necessary to move and operate the control valve.

Another object of my invention is to provide an automatic fluid flow reversing valve of the above type comprising snap acting means associated with the control valve whereby it is snapped sharply between either one of its extreme positions and held snugly therein until a predetermined reverse operating force is applied.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Figure 1:
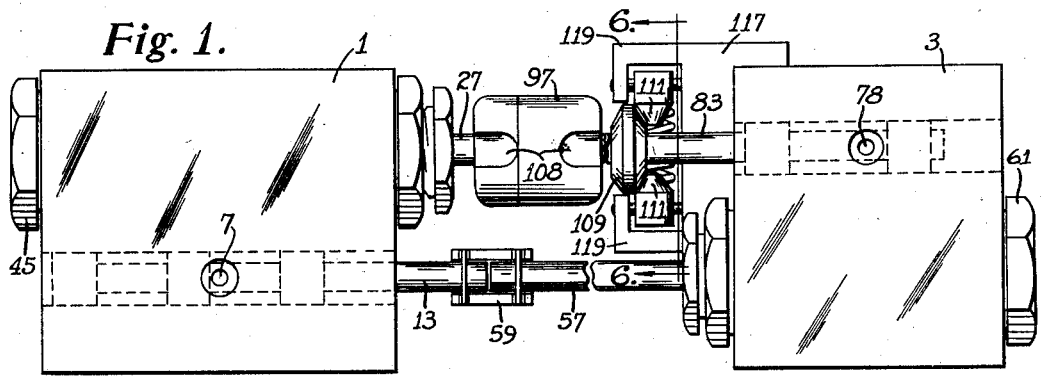
Fig. 1 is a side elevational view of one embodiment of my fluid flow reversing device.

Referring more particularly to Figs. 1–6 of the drawings, my fluid flow reverser is mounted in and enclosed by suitable casing means comprising a valve casing 1 and a control casing 3. In the valve casing 1, fluid dispensing valve means 5 is movably disposed for selectively dispensing fluid injected into an inlet port 7 out of either one of a pair of spaced line ports 9 and 11. For this purpose the fluid dispensing valve comprises a sliding valve of the dumb-bell type consisting of a valve stem or rod 13 which joins three enlarged fluid restricting valve heads 15, 17 and 19 in spaced relation for slidable movement in a guiding aperture 21 into which the inlet port 7 and the line ports 9 and 11 open. The casing 1 may be of any suitable cast metal and the guiding aperture 21 preferably comprises a bore extending therethrough. The inlet port 7 intersects the guiding aperture 21 in substantially the middle portion thereof and the line ports 9 and 11 open therefrom at points equally spaced on opposite sides of the middle or center of the guiding aperture. The flow obstructing valve heads 15, 17 and 19 are suitably spaced upon the valve connecting stem 13 to provide operative connection between the inlet port 7 and either one of the line ports 9 or 11 selectively as the slidable valve 15 reciprocates in either direction in its guiding aperture.

The valve casing 1 is also provided with a second bore 23 of relatively larger diameter which extends through the casing in substantially parallel relation to the valve guiding aperture 21 for slidably receiving a control valve actuating piston 25, for a purpose to be subsequently described. The piston 25 is secured upon the end of a piston rod 27 by clamping nuts 29 which are threadably received thereon in a well known manner. To provide a snug fitting seal against the side walls of the piston guiding aperture 23, leather gaskets 31 of cup shaped conformation are provided on opposite sides of the disk of the piston 25. The cup gaskets are clamped in place, in outwardly turned positions, on the piston by suitable washers 33 which are drawn towards the piston by the clamping nuts 29 as these are turned together upon the threaded end of the piston rod 27.

The piston guiding bore 23 is internally threaded at opposite ends. At the right hand end of the bore 23, as shown, an externally threaded packing gland fixture 35 is threadably secured therein and it comprises an aperture 37 through which the piston rod 27 slides freely. A packing well 39 opens to the outer end of the packing fixture 35 for receiving any suitable packing material 41 encircling the slidable piston rod 27. The packing well 39 is internally threaded to receive an externally threaded packing gland nut 43 which is turned firmly therein for compressing the packing 41 about piston rod 27 to provide an oil-tight seal and to prevent the escape of the working fluid. An annular stop flange 44 projects inwardly from the inner end of the packing fixture 35 to stop the piston in spaced relation therefrom for protecting the edges of the gasket 31.

In the other threaded end of the piston guiding aperture 23, I provide a cylinder head nut 45 which comprises an inwardly projecting stop 47 for engaging the end of the piston rod 27 to limit the movement of the piston 25 therein. The outer ends of the threaded packing fixture 35, the packing gland nut 43 and the cylinder head nut 45 are provided with laterally projecting flanges of hexagonal or other suitable shape for conveniently receiving a wrench whereby they may be conveniently installed in position or removed at will.

Between the ends of the piston guiding aperture 23 and the valve guiding aperture 21, interconnecting fluid conducting passages 49 and 51 are provided in axially spaced relation. The interconnecting passages 49 and 51 are suitably spaced adjacent the ends of the guiding apertures and so arranged with reference to the line ports 9 and 11 and the valve heads 15, 17 and 19 that a fluid conductive connection is provided between either one 9 or 11 of the line ports and the adjacent one 49 or 51 of the interconnecting passages when the valve 5 is moved to a suitable position for connecting the inlet port 7 with the other one of the line ports.

By this arrangement the discharge of high pressure fluid injected through the inlet port 7 into the valve guiding passage 21 and thence through either one of the line ports 9 or 11 causes the operation of the series connected distributing devices, which are arranged in series relation in a well known manner around the distributing line, and the by-passed fluid thereafter returning to the other one of the line ports 11 or 9 is thus transmitted through the interconnecting passage into the valve guiding aperture 23 where it actuates the valve 25 and pushes it to the opposite end of its guiding cylinder for a purpose to be subsequently described.

For automatically controlling the position of the slidable valve 5, for dispensing high pressure fluid alternately from the line ports 9 and 11, I provide an actuator piston 53 which is slidably disposed in a guiding aperture 55 in the control casing 3. The piston 53 is secured upon one end of a piston rod 57, the other end of which is secured firmly in driving relation to the outwardly projecting end of the valve stem 13 by means of any suitable connector 59. The opposite ends of the piston guiding aperture 55 are threaded for receiving at the right hand end, as shown, a threaded cylinder head nut 61. At the other end, the aperture 55 receives a threaded packing gland fixture 63 and packing nut 65 for sealing the piston rod 57 which passes slidably therethrough in the manner previously described with reference to the piston rod 27. Also the piston 53 is similarly secured upon the end of its rod 57 by clamping nuts 67 which are threadably received thereon for clamping the piston 53 between suitable washers 69 and gaskets 71. An inwardly projecting stop portion 73 is provided on the cylinder head nut 61 for limiting the adjacent movement of the piston to protect the edges of the gasket 71.

For controlling the actuating piston 53, I provide a control valve 75 which comprises a dumb bell type of valve slidably disposed in a guiding aperture or bore 77 which extends through the control casing 3 in parallel spaced relation to the piston aperture 55. An inlet port 78 opens through the side of the casing 3 into the bore 77 for injecting high pressure fluid therein. The control valve 75 comprises a pair of enlarged fluid flow obstructing heads 79 and 81 secured in spaced relation upon a stem or rod 83 of reduced section which projects outwardly from the end of the control casing 3.

From the left hand end of the valve guiding aperture 77, fluid conducting means is provided comprising a port 85 which passes downwardly through a passage 87 extending and continues substantially axially through the casing and connecting at its opposite end into a port 89 which opens downwardly into the right hand end of the piston guiding aperture 55. From the right hand end of the control valve guiding aperture 77, a port 91 extends downwardly, passing in unconnected relation by, or around, the conduit 87 and continuing through an axial passage 93 to a perpendicular port passage 95 which extends downwardly and connects into the left hand end of the guiding aperture 55 of the actuator piston 53. Ports and passages are thus provided which extend in criss-cross or X conformation connecting from the left and right hand ends of the valve guiding aperture 77 to the respective right and left hand ends of the aperture 55 which guides the movements of the actuator piston 53.

The outwardly projecting ends of the stem 83 of the control valve and the piston rod 27 of the valve actuating piston are disposed in substantially aligned relation for abutting engagement when the control valve actuating piston 25 moves toward the control valve 75. To provide operative connection for drawing the valve 75 to the left hand end of its stroke as the piston rod 27 moves away from it, I provide a slack motion driving connection 97 therebetween.

The slack motion driving connection comprises a pair of cup shaped connecting members 99 and 101, the bottoms of which are provided with suitable orifices for freely receiving the outwardly extending ends of the piston rod 27 and the valve rod 83 respectively. The inserted ends of the rods 27 and 83 are provided with reduced ends to receive washers 103 and 105, secured thereon in any suitable manner as by threading, by which withdrawal of the ends of the rods from the coupling is prevented. The adjacently turned edges of the cup shaped connection members 99 and 101 are provided with interlocking threads 107 by which they are rigidly secured together and to provide for conveniently screwing the cup shaped members 99 and 101 together, they are preferably provided with indented portions 108.

Figure 2:
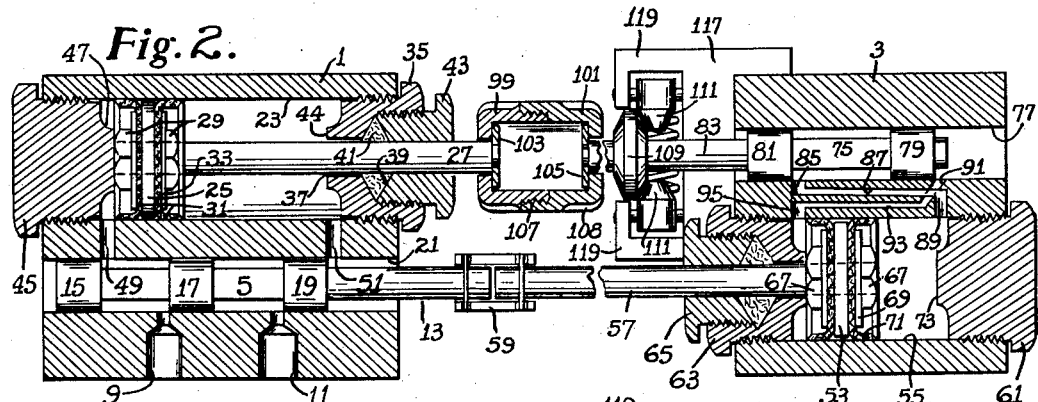
Fig. 2 is a sectional view taken longitudinally therethrough on line 2—2 of Fig. 5 showing the operative relation and interconnection of the moving parts enclosed therein.
Figure 3:
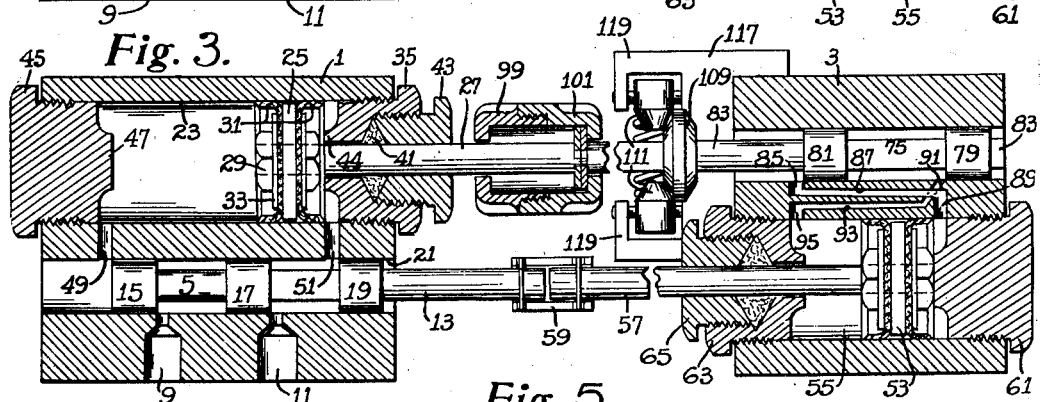
Fig. 3 is a similar view illustrating the operation of the device by showing the parts in a different controlled position.
Figure 4:
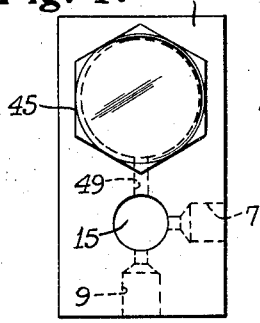
Fig. 4 is an end elevational view of the fluid flow controlling device.
Figure 5:
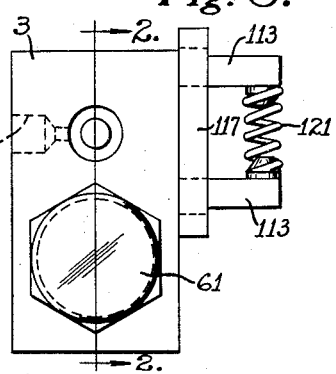
Fig. 5 is a similar view showing the opposite end of the device.
Figure 6:
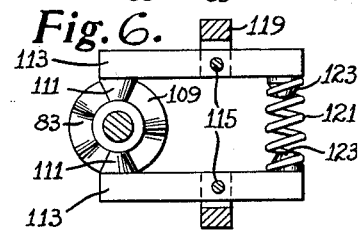
Fig. 6 is a detail sectional view illustrating the snap acting mechanism provided for snapping the control valve quickly between its extreme positions.

As the control valve actuating piston 25 is moved toward the valve 75, from the position shown in Fig. 2, it will be apparent that no motion whatever is imparted to the valve 75 until the approaching end of the rod 27 engages the adjacent end of the valve rod 83 in abutting engagement, as shown in Fig. 3. Also it will be apparent that when the piston is moved in a reverse direction from the position shown in Fig. 3 to the left hand end of its bore, no motion is imparted to the valve 75 until the piston rod 27 is sufficiently withdrawn to carry the transverse washer 103 in abutting engagement against the bottom of the connecting member 99, in the position as shown in Fig. 2. Before such abutting engagement has been established for driving the valve 75 in either direction, it will be apparent that a predetermined degree of slack movement of the control valve operating piston is provided.

To provide for snapping the control valve 75 quickly from either extreme position to its alternative extreme position, I provide a cam disk 109 upon the valve rod 83, the peripheral edges of which provide a camming surface. For resiliently engaging the edges of the camming disk 109 as the valve rod reciprocates to and fro, I provide a pair of camming fingers 111 which engage the edges of the camming disk at points which are substantially diametrically opposed. For this purpose each one of the camming fingers 111 is mounted upon the end of a lever 113 and each lever is pivotally journalled upon a pivot pin 115 supported at opposite ends between a supporting plate 117 and the outer end of a downturned arm 119 projecting therefrom. The levers 113 are thus pivoted adjacent the edge of the plate and substantially perpendicular thereto. A compression spring 121 is inserted in compressed relation between the opposite ends of the pivoted arms 113 which are provided with spring retaining projections 123.

By this arrangement, a spring biased pincher mechanism is provided and the supporting plate 117 thereof is secured upon the side of the control casing 3 in any suitable manner as by welding thereto. The spring biased snap acting mechanism is thus suitably mounted upon the casing to cam the edges of the camming disk 109 for snapping the control valve quickly between its alternative extreme positions.

My fluid flow reversing device is installed for use by mounting it in the reservoir which contains the fluid or lubricant which is to be distributed by an associated system (not shown) which is connected from the line ports 9 and 11, as previously described. For convenience in mounting, the valve casing 1 and the control casing 3 may be provided with any convenient mounting means as will be readily understood. For this purpose the casings 1 and 3 may be conveniently secured upon the bottom of the reservoir, or to a unitary base plate which in turn may be readily fastened in any position in the oil reservoir in which the device is to be installed. For operation, my fluid flow device is connected to receive high pressure fluid or lubricant from any suitable source, such as a pump (not shown), which draws fluid from the reservoir and from which a high pressure line is connected to the inlet ports 7 and 78 in the casings 1 and 3 respectively.

In operation the position of the parts, as shown in Fig. 2, is such that the high pressure fluid received by the inlet port 7 in the valve casing 1 is being dispensed through the line port 11 into the end of an associated line (not shown). For this purpose the fluid dispensing valve 5 is at the left hand end of its stroke to which position it was moved by the piston actuator 53 by high pressure fluid applied to the right hand side thereof. The pressure is thus applied to the piston 53 through the ports and passages 89, 87 and 85 through which the high pressure fluid is transmitted from the inlet port 78 in the casing 3. After moving the valve 5 to its left hand position, the pressure is still applied to the actuating piston 53 and thus serves to hold the valve in its extreme position. The high pressure fluid in passing through the system (not shown) operates a purality of series connecting feeding devices in a manner well known in such systems.

When sufficient high pressure fluid has been discharged from line port 11 to completely operate all the distributing devices in the distributing system, the fluid then returns from the other end of the line through the line port 9 and passes around the reduced portion of the valve 5 through passage 49 to the left hand side of the control valve actuating piston 25 directly thereabove. The pressure thus established pushes the control valve operating piston 25 to the right hand side of its stroke. As the piston 25 moves to the right, fluid previously injected into its guiding bore 23 is now discharged therefrom through the passage 51 at the right hand end and thence outwardly from the right hand end of the valve guiding aperture 21 into the reservoir in or above which the device is mounted. After a predetermined motion in this direction, the right hand end of the piston rod 27 abuts the adjacent end of the valve rod 83 and pushes the valve 75 until sufficient pressure is developed to separate the camming points 111 after which the camming disk 109 snaps sharply to the right and throws the valve 75 to the extreme right hand position, as shown in Fig. 3.

The valve 75, which is now moved to the extreme right hand position, establishes a connection for conducting the high pressure fluid received in the inlet port 78, in the casing 3 by way of passages 91, 93 and 95 to the left hand side of the actuating piston 53. At the same time the movement of the valve 75 opened a discharging connection from the right hand end of the piston chamber 55 by way of passages 89, 87 and 85 thence outwardly through the left hand end of the bore 77 into the aforesaid reservoir. As the actuating piston now moves to the right, the previously entrapped fluid is discharged therefrom through the discharging connection previously described.

The cycle of operation is thus repeated for automatically discharging high pressure fluid from the outlet ports 9 and 11 successively so long as high pressure fluid is supplied to the inlet ports 7 and 78 and so long as the feeding devices in the distributing circuit respond properly to permit the high pressure fluid to flow completely therethrough and return from the other end of the line.

In accordance with another embodiment of my invention, I have provided a compact assembly wherein the casing means comprises a unitary casting 131 for housing the fluid dispensing valve and the associated control valve and pistons. The casing casting 131 is provided with four apertures 133, 134, 135 and 136 which extend therethrough. The guiding apertures may be provided by boring the casting, in any suitable manner, after which the inside surfaces of the bores are ground to provide smooth surfaces and accurate dimensions. At the left hand end of the bore 134, I provide an enlarged counterbore 137, as shown. Slidably disposed in the bore 134, I provide a fluid guiding and piston controlling valve 139 which comprises a pair of enlarged valve heads 141 and 143 secured in spaced relation along a valve rod 145 which extends freely from the open right hand end of the aperture. Upon the left hand end of the valve rod 145, I provide an enlarged camming portion 147 which reciprocates in the enlarged counter-bore 137 and has tapered side walls for camming engagement by a suitable biased camming member to provide a snap action, as will be subsequently described. After the fluid guiding and piston controlling valve 139 is inserted in its guiding aperture 134, a stop screw 148, having a large flat head, is threadably secured on one end of the valve casing with a portion of the head projecting into the valve guiding aperture for limiting the movement of the valve therein.

Figure 11:
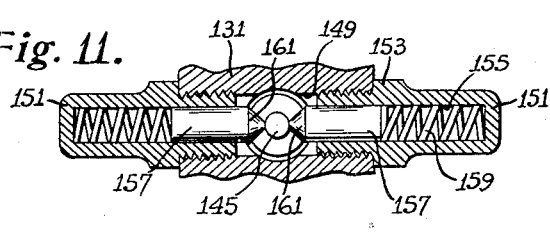
Fig. 11 is a fragmentary sectional view taken on line 11—11 of Fig. 9 for showing the snap acting mechanism provided therein.

To provide snap action, a transversely disposed aperture 149 extends transversely through the casing member 131 opening on opposite sides thereof and intersecting the enlarged counterbore 137, as shown. The transverse aperture 149 is internally threaded at the opposite ends thereof for threadably receiving camming fixtures 151 therein, as shown in Fig. 11. Each of the camming fixtures 151 is provided with laterally projecting shoulders 153 comprising a suitable hexagonal nut to which a wrench may be conveniently applied for installing or removing the fixture upon the casing 131. Each of the fixtures 151 is drilled axially to provide a cylindrical bore 155 therein for receiving a slidable camming member 157 and a compression spring 159 disposed between the closed end of the chamber and the end of the camming member. The outwardly projecting ends of the slidable camming fingers 157 are provided with tapered points 161 which ride against the opposite sides of the valve rod 145.

When the valve rod 145 is reciprocated between the spring biased camming members 157, the tapered points 161 thereof ride in spring biased engagement up the inclined end surfaces of the snap acting cam 147, and engaging the inclined surfaces on the other side thereof cause the valve rod 145 and its associated valve means to be snapped quickly to the extreme position in either direction.

Upon the end of the valve rod 145 projecting from the right hand end of the casing, an operator arm 163 is received in free sliding relation between spaced pairs of stop nuts 165 and 167. The outer end of the valve rod 145 is suitably threaded for receiving and securing the stop nuts 165 and 167 which may thereby be conveniently adjusted to vary the spaced relation between them. By installing the stop nuts 165 and 167 in pairs they may be turned together for locking them upon the valve rod in any adjusted position, as will be readily understood. By suitably adjusting the respective pairs of locked stop nuts 165 and 167 on the rod 145 the degree of slack motion can be regulated and my fluid flow reversing device can be adjusted to have the operating characteristics desired. A permanent stop flange 169 may be rigidly secured upon the valve rod 145 adjacent the stop nuts 167, in any suitable manner.

The lower end of the operator arm 163 is rigidly secured upon the outwardly projecting end of a piston rod 171 in any suitable manner, as by passing the end of the rod through a suitable aperture in the operator and clamping it thereto by clamping nuts 173 threadably secured thereon. The piston rod 171 extends into the cylindrical aperture 136 in the casing where it is secured to the actuator piston 175 which serves to operate the fluid guiding and piston controlling valve 139. The actuating piston rod 171 passes through a snug fitting guide block 177 which is inserted snugly into the end of the cylinder bore. To provide a snug fit, the guide block 177 is carefully ground and fitted. At the left hand end of the piston guiding aperture 136, a closure plug 179 is inserted in snug fitting relation.

For controlling the application of high pressure fluid to operate the actuating piston 175, a fluid dispensing and piston controlling valve 181 is slidably disposed in the cylindrical bore 135 adjacent the bore 136. This fluid dispensing and piston controlling valve comprises a valve rod 183 upon which are mounted enlarged fluid flow obstructing portions or valve heads 185, 187 and 189 in spaced relation. The side wall of the bore 135 is preferably provided with cut-out portions or undercuts 188 and 190 for releasing pressure on the outgoing side of the line as piston 181 is moved in either direction to diminish the sliding friction of the valve.

The outwardly projecting end of the valve rod 183 is threadably secured to one end of an arm 191 by means of suitable clamping nuts 193 threadably engaged thereon. The opposite end of the operating arm 191 is in like manner secured by clamping nuts 195 with the outwardly projecting end of a piston rod 197 which extends through a guide block 199 in the adjacent end of the cylindrical bore 133. A piston 201 is rigidly secured upon the inner end of the piston rod 197 for operating the latter when high pressure fluid has passed completely around the line and returned therefrom. The other end of the piston guiding aperture 133 is closed by a plug 202 which fits snugly therein.

Briefly, high pressure fluid is received in the inlet port 203 and the fluid dispensing and piston controlling valve 181 selectively dispenses the high pressure fluid out of either one of the line ports 209 or 211 in accordance with its position in the casing. When the high pressure fluid passes completely around the distributing line and returns from the other end thereof into the casing, it moves the control valve-operating piston 175 gradually and after the arm 163 has taken up the slack motion between the adjustable nuts 165 and 167, it moves the fluid guiding and piston controlling valve 139, whereupon, fluid under pressure entering the bore 134 from a passage 207, to be hereafter described, is then guided to the opposite side of piston 201, thus moving the same and thereby moving the control valve 181 to apply the high pressure fluid to the valve actuating piston 175, which is thus operated in turn for actuating and reversing the position of the dispensing valve 139.

Figure 7:
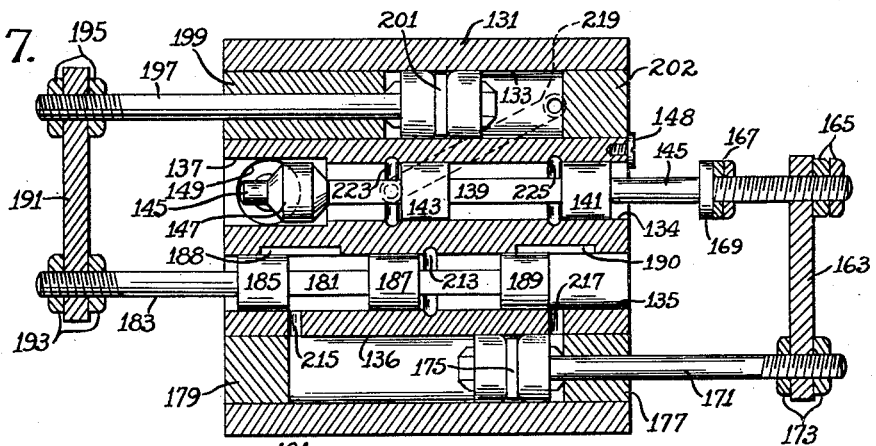
Fig. 7 is a longitudinal sectional view showing another embodiment of my fluid flow reversing device, taken on line 7—7 of Fig. 10.

This cycle of operations is repeated successively as long as high pressure fluid is applied in the inlet port 203. As shown in Fig. 7, the piston 175 has just completed a movement to the right and it has similarly moved the controlling valve 139. As a result the piston 201 is about to move to the right, and the complete operation of the device will subsequently be fully described in detail.

In order to accomplish such operations in the compact unitary embodiment of my fluid flow reversing device, the unitary casing 131 is provided with suitable ports and fluid conducting passages which details of construction will now be described.

Figure 9:
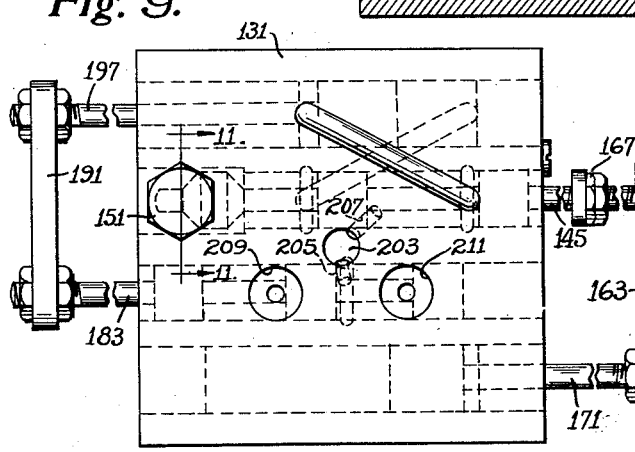
Fig. 9 is a side elevational view of the same device showing the interconnecting passages and related parts in dotted lines.
Figure 10:
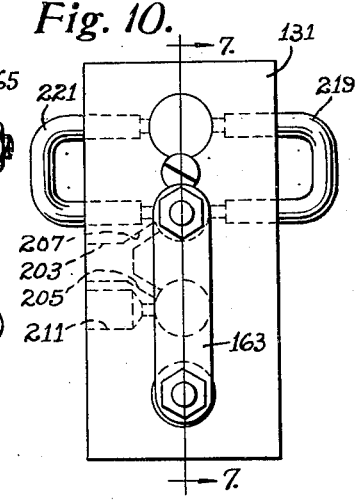
Fig. 10 is an end elevational view of the device.

For receiving high pressure fluid or lubricant from a high pressure pump or any suitable source, the casing 131 is provided with an inlet port 203 which opens through one side wall of the casing substantially in the middle thereof, as shown in Fig. 9. It will be understood that the high pressure inlet port 203 may be conveniently provided with any suitable pipe fitting (not shown) by which it may be conveniently connected with any high pressure fluid delivering pipe. The connection of the high pressure inlet port 203, as shown also in Fig. 10, extends through a downwardly inclined fluid conducting passage 205 by which it is connected into the guiding aperture 135 in which the dispensing valve 181 is slidably disposed. From the inner end of the inlet port 203, another fluid conducting passage 207 extends in an upwardly inclined direction connecting into the guiding aperture 134 of the control valve 139.

For dispensing the high pressure fluid received in the casing 131 through the inlet port 203, a pair of line ports 209 and 211 are provided in the side wall thereof and arranged in alignment with the guiding aperture 135 of the dispensing valve 181 into which they open in axially spaced points disposed equally on opposite sides of the midpoint of the dispensing valve aperture. As previously set forth, the inlet port 203 delivers high pressure fluid through the passage 205 into the guiding bore 135 of the dispensing valve 181 at a point substantially in the middle thereof, and to facilitate delivery of the fluid therein, this guiding aperture may be provided with a groove 213 cut circumferentially around the side wall thereof. The line ports 209 and 211 are each provided with suitable pipe fittings by which they are conveniently connectible to the opposite ends of a fluid distributing line (not shown), and they are suitably spaced on opposite sides of the middle point of the guiding aperture and so arranged with reference to the enlarged fluid restricting heads 185, 187 and 189 of the dispensing valve that high pressure fluid which is injected into the inlet port 203 is dispensed selectively from either one of the line ports 209 or 211 in accordance with the position of the dispensing valve 181 in its guiding aperture.

Additional conducting passages 215 and 217 are provided for interconnecting between the outer portions of the guiding apertures of the dispensing valve 181 and the control valve operating piston 175 respectively. The conducting passages 215 and 217 are cut through the separating walls between these adjacent guiding passages 135 and 136 at points spaced equally but at greater distance from the center than are the line ports 209 and 211, and they are so related to the spaced flow restricting valve heads 185, 187 and 189 that when the dispensing valve 181 is moved for connecting either line port to receive high pressure fluid from the inlet port 203, the alternate one of the line ports is simultaneously connected to deliver fluid returning therethrough into the adjacent end of the aperture 136 in which the control valve operating piston 175 operates.

By this arrangement the control valve operating piston 175 is reversibly actuated after the operation of the dispensing valve 181 to inject high pressure fluid into either end of the distributing line but not until all the distributing feeders in the line have been successively operated in a well known manner and the dispensed fluid has returned from the other end of the line.

The control valve 139, in either extreme position, controls the delivery of high pressure fluid from the inlet port 203 to either side of the actuating piston 201 and to provide connections for this purpose a fluid transmitting conduit 219 is connected at one end into the guiding aperture 134 of the control valve at a point axially spaced from the point through which the passage 207 enters from the inlet port 203. At the other end, the conduit 219 is connected into the guiding aperture 133 which guides the movements of the actuating piston 201. From the opposite end of this aperture 133 a fluid transmitting conduit 221 is connected which extends downwardly and connects into the guiding passage 134 of the dispensing valve at a point substantially spaced on the opposite side of the point receiving pressure through passage 207 from inlet port 203.

The fluid transmitting conduits 219 and 221 are connected into the guiding aperture 134 of the control valve at suitably spaced points with reference to the spaced valve heads 141 and 143 and with reference to the point to which the passage 207 enters from the inlet port 203 so that the movement of the control valve to either extreme position in its aperture provides a suitable connection for transmitting the high pressure fluid into the piston guiding aperture 133 for applying pressures on opposite sides of the actuating piston 201 to reversibly operate the same. Circumferential grooves 223 and 225 are preferably cut circumferentially around the inner walls of the valve guiding aperture 134 to facilitate delivering the high pressure fluid to the interconnected ends of the conduits 219 and 221.

Operation in detail occurs as follows: High pressure fluid enters the inlet port 203 from which it divides, a portion entering the casing through passage 205, see Figs. 9 and 10, for dispensing and a portion going through passage 207 to supply pressure for moving certain parts of the device.

The portion of fluid flowing through passage 205 for dispensing goes around groove 213 in bore 135, as shown in Fig. 7, and with the parts all in their positions as there shown, fluid has been flowing around the part of valve member 181 between the heads 187 and 189, and from the outlet dispensing port 211 which opens therefrom. The fluid has completed the circuit around the system (not shown) operating all the feeders, and the by-passed fluid has just returned into port 209. The returning fluid has passed between the heads 185 and 187 of the valve 181 flowing down through passage 215 into bore 136, where it has pushed the piston 175 to the right. This movement of piston 175 to the right has just been completed, as shown in Fig. 7, and this has moved the piston control valve 139 to the right as there shown.

The next operation is the movement of piston 201 to the right. This follows because high pressure fluid passes from inlet port 203 through passage 207 into bore 134 between valve heads 141 and 143, see Fig. 9, and thence out through conduit 221, shown in Figs. 9 and 10, into upper bore 133 at the left of piston 201, forcing it to the right. This also moves the associated fluid dispensing valve 181 to the right, and fluid is dispensed from inlet port 203 by way of passage 205, between valve heads 185 and 187 out of outlet port 209 into the system (not shown). Also as the head 189 of valve 181 passes to the right of passage 217, return fluid by-passed around the system is connected through 217 into bore 136 at the right of piston 175 and the piston 175 is thus forced to the left. The movement of piston 175 to the left also carries the piston controlling valve 139 to the left after taking up the slack motion.

Figure 8:
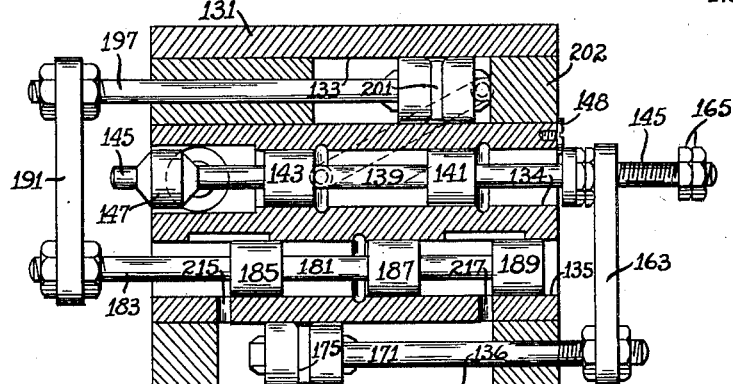
Fig. 8 is a similar view showing the same device and illustrating its operation by showing the parts in a different operative position.

The parts are now positioned as shown in Fig. 8. In this postion high pressure fluid enters through inlet port 203, passage 207, around valve 139 between heads 141 and 143, thence by way of passage 219 into the upper bore 133 at the right of piston 201, which is thus forced to the left carrying with it the fluid dispensing valve 181.

This cycle of operations continues reversibly and successively and the high pressure fluid is delivered alternately to opposite ends of a distributing line connected from the line ports 209 and 211, as will be readily understood.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

I claim:

1. In a fluid flow reversing device the combination of, a casing, apertures in said casing comprising an inlet port and two line ports, fluid dispensing valve means movably disposed in said casing for selectively dispensing injected fluid from said inlet port out of one of said line ports into the end of an associated line, an actuating piston connected for shifting said movable dispensing valve means to dispense the fluid out of the other of the line ports, a control valve for controlling the admission of fluid pressure to the opposite ends of said actuating piston, a control valve actuating piston responsive to the return of dispensed fluid from an associated line into said other one of said line ports for actuating said control valve, and interconnecting means providing a substantial slack motion connection between said control valve and said control valve actuating piston.

2. In combination in a fluid flow reversing device, casing means, a fluid dispensing valve comprising a single member having spaced valve heads, a single guiding aperture in said casing means for slidably receiving said fluid dispensing valve, port recesses opening into said guiding aperture comprising an inlet port and two line ports for connection with the ends of a fluid distributing line, a unitary actuating piston connected to said dispensing valve, a single guiding aperture in said casing means for slidably receiving said actuating piston, a reciprocating control valve for applying fluid pressure to said actuating piston for reversely operating said fluid dispensing valve, a control valve actuating piston connected to said control valve, means controlled by said fluid dispensing valve for applying fluid returned from an associated line for reversibly operating said control valve actuating piston, connecting rods extending respectively from said control valve and from said control valve actuating piston, and slack motion means interconnecting said extended connecting rods whereby the control valve actuating piston is permitted a substantial and predetermined freedom of movement in either direction before the control valve is moved thereby.

3. In combination in a fluid flow reversing device, casing means, a fluid dispensing valve, a guiding aperture in said casing means for slidably receiving said fluid dispensing valve, port recesses opening into said guiding aperture comprising an inlet port and two line ports for connection with the ends of a fluid distributing line, an actuating piston connected to said dispensing valve, a guiding aperture in said casing means for slidably receiving said actuating piston, a control valve for applying fluid pressure to said actuating piston for reversely operating said fluid dispensing valve, a control valve actuating piston connected to said control valve, means controlled by said fluid dispensing valve for applying fluid returned from an associated line for reversibly operating said control valve actuating piston, driving means interconnecting said control valve and the control valve actuating piston, and snap acting means associated with said driving means for snapping said control valve quickly from either extreme position to the alternate position.

4. In combination in a fluid flow reversing device, casing means, a fluid dispensing valve, a guiding aperture in said casing means for slidably receiving said fluid dispensing valve, port recesses opening into said guiding aperture comprising an inlet port and two line ports for connection with the ends of a fluid distributing line, an actuating piston connected to said dispensing valve, a guiding aperture in said casing means for slidably receiving said actuating piston, a control valve for applying fluid pressure to said actuating piston for reversely operating said fluid dispensing valve, a control valve actuating piston connected to said control valve, means controlled by said fluid dispensing valve for applying fluid returned from an associated line for reversibly operating said control valve actuating piston, connection rods extending respectively from the control valve and from the control valve actuating piston, a slack motion coupling for connecting the extended ends of said rods in operative driving relation, a cam disk on the extended end of the control valve rod, a camming means disposed for engaging the edges of said camming disk at substantially opposed points comprising a spring biased pincher, said spring biased pincher being suitably mounted upon said casing means for snapping said control valve quickly between its alternate extreme positions.

5. In a fluid flow reversing device the combination of, a valve casing, a valve guiding aperture therein, an inlet port opening into said aperture, a pair of spaced line ports opening therefrom, a fluid dispensing valve slidably disposed in said aperture for dispensing fluid from said inlet port selectively out of either one of said line ports, a control casing disposed in adjacent spaced relation to said valve casing, a piston guiding aperture in said control casing in substantially aligned relation to said valve guiding aperture, an actuating piston slidably disposed therein, a valve rod extending from said valve, a piston rod extending from said actuating piston, means connecting said rods in substantially aligned relation, a control valve slidably disposed in said control casing, conduit means controlled by said control valve for applying fluid pressure to reversely operate said actuating piston, a control valve actuating piston slidably disposed in said valve casing, additional conduit means controlled by said fluid dispensing valve for conducting fluid returned through either alternate one of said line ports to apply operating pressure to reversely operate said control valve actuating piston, and means operatively driven thereby for moving said control valve in the control casing to reversely operate the actuating piston therein.

6. In a fluid flow reversing device the combination of, a valve casing, a valve guiding aperture therein, an inlet port opening into said aperture, a pair of spaced line ports opening therefrom, a fluid dispensing valve slidably disposed in said aperture for dispensing fluid from said inlet port selectively out of either one of said line ports, a control casing disposed in adjacent spaced relation to said valve casing, a piston guiding aperture in said control casing in substantially aligned relation to said valve guiding aperture, an actuating piston slidably disposed therein, a valve rod extending from said valve, a piston rod extending from said actuating piston, means connecting said rods in substantially aligned relation, a control valve slidably disposed in said control casing, port means controlled by said control valve for applying fluid pressure to reversely operate said actuating piston, a control valve actuating piston slidably disposed in said valve casing, additional port means controlled by said fluid dispensing valve for conducting fluid returned through either alternate one of said line ports to apply operating pressure to reversely operate said control valve actuating piston, slack motion means driven thereby for moving said control valve after said control valve actuating piston has moved a predetermined distance, and a snap action mechanism for throwing said control valve quickly to either of two extreme positions after it has started through a predetermined distance.

7. In combination in a fluid flow reversing device, a fluid dispensing valve, a fluid pressure responsive actuator for operating said dispensing valve, a slidable control valve for applying fluid pressure to reversibly operate said actuator, a valve rod extending from said control valve, a cam disk on said rod, spring biased camming means for engaging the edge of said disk to snap said control valve to either extreme position, and a fluid pressure responsive actuator for moving said valve rod.

8. In combination in a fluid flow reversing device, a fluid dispensing valve, a fluid pressure responsive actuator for operating said dispensing valve, a control valve for applying fluid pressure to reversibly operate said actuator, a fluid pressure responsive control valve actuator, slack motion driving means connected between said control valve and the control valve actuator and snap acting means associated with said control valve whereby the latter is snapped quickly to its extreme position in a corresponding direction after its movement has been started through said slack motion driving means.

9. In combination in a fluid flow reversing device, a fluid dispensing valve, a fluid pressure responsive actuator for operating said dispensing valve, a control valve for applying fluid pressure to reversibly operate said actuator, a valve rod extending from said control valve, a cam disk on said rod, spring biased camming means for engaging the edge of said disk to snap said control valve to either extreme position, a fluid pressure responsive piston, a rod projecting from said piston in substantially aligned relation with said valve rod, a slack motion connector comprising a chamber, orifices in opposite sides of said chamber for freely receiving the ends of said rods, and a transversely disposed member in the end of each rod to prevent its withdrawal from the coupling chamber.

10. In a fluid flow reversing device the combination of, a fluid dispensing valve, an actuating piston therefor, a control valve for operating said piston, a control piston connected for operating said control valve, a casing comprising separated guiding apertures for slidably receiving said valves and pistons, an inlet port and two line ports in said casing and so connected into the guiding aperture of the fluid dispensing valve that fluid from the inlet port is dispensed selectively from one of the line ports as the valve is moved to one of two extreme positions therein, additional conduit means controlled by the movements of the fluid dispensing valve for directing returned fluid from one of said line ports to reversely operate said control valve operating piston, and conduit means controlled by said control valve for reversely operating said actuating piston for moving the fluid dispensing valve.

11. In a fluid flow reversing device the combination of, a casing, an inlet port in said casing, two line ports in said casing, four guiding apertures extending through said casing in substantially parallel spaced relation, a fluid dispensing valve slidably disposed in one of said apertures, conduit means controlled thereby for dispensing fluid received from said inlet port selectively through either one of said line ports, a valve rod on said dispensing valve extending from one end of its guiding aperture, an actuating piston slidably disposed in another one of said guiding apertures, a rod extending from said piston out of the end of its guiding aperture adjacent said valve rod, means operatively interconnecting said valve rod and said piston rod, a control valve slidably disposed in a different one of said guiding apertures, associated conduit means controlled thereby for applying fluid pressure to reversely operate said actuating piston, a control valve rod projecting from its guiding aperture in a direction opposite from the above recited valve and piston rods, a control valve operating piston slidably disposed in the other one of said guiding apertures, means for applying fluid pressure to opposite sides thereof, a rod on said control valve operating piston projecting from the same end of its guiding aperture as said control valve rod, and means operatively connecting it thereto for operating the control valve.

12. In a fluid flow reversing device the combination of, a casing, an inlet port in said casing, two line ports in said casing, four guiding apertures extending through said casing in substantially parallel spaced relation, a fluid dispensing valve slidably disposed in one of said apertures, conduit means controlled thereby for dispensing fluid received from said inlet port selectively through either one of said line ports, a valve rod on said dispensing valve extending from one end of its guiding aperture, an actuating piston slidably disposed in another one of said guiding apertures, a rod extending from said piston out of the end of its guiding aperture adjacent said valve rod, means operatively interconnecting said valve rod and said piston rod, a control valve slidably disposed in a different one of said guiding apertures, associated conduit means controlled thereby for applying fluid pressure to reversely operate said actuating piston, a control valve rod projecting from its guiding aperture in a direction opposite from the above recited valve and piston rods, a control valve operating piston slidably disposed in the other one of said guiding apertures, means controlled by said dispensing valve to control fluid returning through one of said line ports for applying fluid pressure thereto, a rod on said control valve operating piston projecting from the same end of its guiding aperture as said control valve rod, and slack motion driving means operatively interconnected between the rods extending from the control valve and the control valve operating piston.

EDWIN J. HULL.